United States Patent
Setty et al.

(10) Patent No.: US 11,210,150 B1
(45) Date of Patent: Dec. 28, 2021

(54) CLOUD INFRASTRUCTURE BACKUP SYSTEM

(71) Applicant: Dell Products L.P., Round Rock, TX (US)

(72) Inventors: Umadevi Setty, Bangalore (IN); Vishwanath Hulikal Ramegowda, Bangalore (IN); Naman Goel, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/996,474

(22) Filed: Aug. 18, 2020

(51) Int. Cl.
*G06F 11/08* (2006.01)
*G06F 11/00* (2006.01)
(Continued)

(52) U.S. Cl.
CPC ........ *G06F 11/008* (2013.01); *G06F 11/1451* (2013.01); *G06F 11/1469* (2013.01); *H04L 67/1097* (2013.01); *G06F 2201/82* (2013.01)

(58) Field of Classification Search
CPC ............... G06F 11/008; G06F 11/1451; G06F 11/1469; G06F 11/1474; G06F 11/3608;
(Continued)

(56) References Cited

U.S. PATENT DOCUMENTS 7,539,907 B1 * 5/2009 Johnsen ................ G06F 11/008
714/26

2008/0222456 A1 * 9/2008 Jones .................. G06F 11/0778
714/45
(Continued)

OTHER PUBLICATIONS

Yong Xu et al. "Improving Service Availability of Cloud Systems by Predicting Disk Error," This Paper is Included in the Proceeding of the 2018 USENIX Annual Technical Conference (USENIX ATC'18), Jul. 11-13, 2018, Boston, MA, USA, ISBN 978-1-939133-02-1, printed from https://www.usenix.org/system/files/conference/atc18/atc18-xu-yong.pdf on Aug. 16, 2020, 14 Pages.
(Continued)

*Primary Examiner* — Kamini B Patel
(74) *Attorney, Agent, or Firm* — Joseph Mencher

(57) ABSTRACT

An infrastructure backup system includes an infrastructure manager system coupled to infrastructure devices via a network. A first infrastructure device includes a management controller database storing component dependency information identifying dependenc(ies) between a first component in the first infrastructure device and a second component in a second infrastructure device. A management controller device in the first infrastructure device receives a predicted failure for the first component from the infrastructure manager system and performs first backup operations to generate first component backup data based on the identification of the predicted failure for the first component. Based on the component dependency information that identifies the dependency between the first component and the second component, the management controller device also performs second backup operations to generate second component backup data. The management controller device then transmits the first and second component backup data via the network for storage on a backup storage system.

20 Claims, 15 Drawing Sheets

(51) Int. Cl.
  *G06F 11/14* (2006.01)
  *H04L 29/08* (2006.01)
(58) Field of Classification Search
  CPC ............. G06F 11/3612; G06F 11/3624; G06F 11/3636; G06F 11/3648; G06F 11/366
  See application file for complete search history.

(56) References Cited

U.S. PATENT DOCUMENTS

| | | | | |
|---|---|---|---|---|
| 2013/0290780 A1* | 10/2013 | Karp. | ................. | G06F 11/1482 714/19 |
| 2013/0326272 A1* | 12/2013 | Yochai | ............... | G06F 12/0868 714/15 |
| 2015/0195192 A1* | 7/2015 | Vasseur | ............... | G06F 11/2007 714/47.3 |
| 2015/0278374 A1* | 10/2015 | Van De Poel | ...... | G06F 16/9535 707/722 |
| 2015/0365478 A1* | 12/2015 | Bernal | .................... | H04L 67/10 709/203 |
| 2015/0381435 A1* | 12/2015 | Todd | ..................... | G06F 9/4856 709/223 |
| 2016/0092308 A1* | 3/2016 | Bates | ................... | G06F 11/142 714/4.11 |
| 2016/0170811 A1* | 6/2016 | Peacock | .................... | G06F 9/52 718/106 |
| 2017/0214701 A1* | 7/2017 | Hasan | ................. | H04L 63/1491 |
| 2018/0232162 A1* | 8/2018 | Bode | ................... | G06F 12/0862 |
| 2020/0081793 A1* | 3/2020 | McBride | .............. | G06F 3/0689 |

OTHER PUBLICATIONS

"S.M.A.R.T.; From Wikipedia, the free encyclopedia," This Page was Last Edited on Jul. 22, 2020 at 08:39 (UTC), printed from https://en.wikipedia.org/wiki/S.M.A.R T. on Aug. 16, 2020, 17 Pages.

Microsoft, "Windows Hardware Error Architecture (WHEA) Design Guide," Apr. 20, 2017 • 2 minutes to read •, printed from https://docs.microsoft.com/en-us/windows-hardware/drivers/whea/ on Aug. 16, 2020, 1 Page.

* cited by examiner

CLOUD INFRASTRUCTURE BACKUP SYSTEM

BACKGROUND

The present disclosure relates generally to information handling systems, and more particularly to backing up information handling systems that provide a cloud infrastructure.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as server devices, switch devices, and/or storage devices, are sometimes utilized to provide a "cloud" infrastructure system that may perform a variety of cloud computing functionality that provides users with on-demand availability of computing system resources without requiring direct active management by those users. For example, cloud infrastructure systems are often provided in datacenter(s) and made available to users via the Internet, with some relatively large cloud infrastructure systems providing functions distributed over multiple datacenter locations. However, the backing up and restoration of cloud infrastructure systems can raise some issues. For example, in situations where cloud infrastructure devices and/or their components in a cloud infrastructure system are to-be upgraded and/or have their configurations changed, it is desirable to perform a backup of the cloud infrastructure system so that, in the case of a failure of any of those cloud infrastructure devices and/or components, the cloud infrastructure system can be restored relatively quickly and easily. However, the management of cloud infrastructure systems is relatively complex due to, for example, complex security policies implemented with the cloud infrastructure systems, inter-dependencies between the hardware components in the cloud infrastructure systems, inter-dependencies between the software components in the cloud infrastructure systems, inter-dependencies between the hardware components and the software components in the cloud infrastructure systems, complex upgrade workflows utilized with the cloud infrastructure systems, and/or other cloud infrastructure management complexities that would be apparent to one of skill in the art in possession of the present disclosure.

For example, multiple cloud infrastructure device and/or component configurations at both the hardware and software level may depend on each other to provide the complete cloud infrastructure system that includes compute, storage, and networking layers. In a specific example, a Software Defined Storage (SDS) utilized in the cloud infrastructure system may depend on a compute node cluster and pool of storage, and may require hardware and software configurations that are mapped to provide a working solution. In another specific solution, a Virtual Local Area Network (VLAN) configuration may map to VLAN values provided on a Top Of Rack (TOR) switch that connects the cloud infrastructure system to the Internet. Similarly, Software Defined Networking (SDN) utilized in the cloud infrastructure system may operate to control Network Address Translation (NAT) and network traffic (e.g., via Access Control Lists (ACLs)), and may operate based on a configuration mapping available at the TOR switch and compute nodes where the SDN is deployed.

Conventional cloud infrastructure systems manage their hardware components and software components separately, and thus perform backups of those hardware and software components separately (i.e., data protection or backup solutions operate on independent components without consideration of how those components operate together). As such, the hardware components and software components in cloud infrastructure systems are not backed up in a synchronized manner, and thus the dependencies between those hardware and software components is not considered in those backups, which can result in issues during the restoration of a failed cloud infrastructure system, and may then require time consuming rebuilds of the hardware component(s) and/or restoration of the software components for those hardware components. As will be appreciated by one of skill in the art, such cloud infrastructure restoration failures result in downtime for the cloud infrastructure system, and may be associated with catastrophic errors and/or data loss.

Accordingly, it would be desirable to provide a cloud infrastructure backup system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a management controller engine that is configured to: receive, via a network from an infrastructure manager system, an identification of a predicted failure for a first component included in a first infrastructure device; perform, based on the identification of the predicted failure for the first component, first backup operations on the first component to generate first component backup data; perform, based on component dependency information that identifies at least one dependency between the first component and a second component in a second infrastructure device, second backup operations on the second component to generate second component backup data; and transmit the first component backup data and the second component backup data via the network for storage on a backup storage system.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
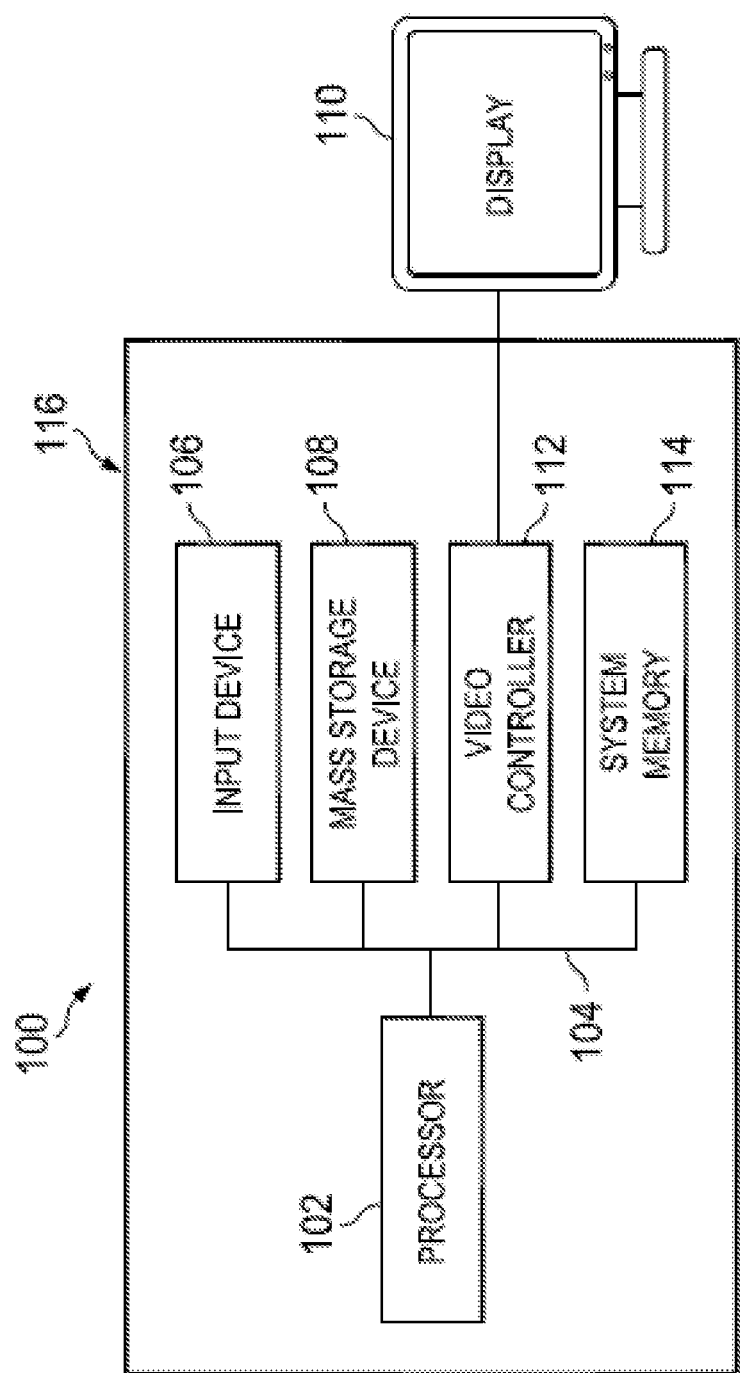
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
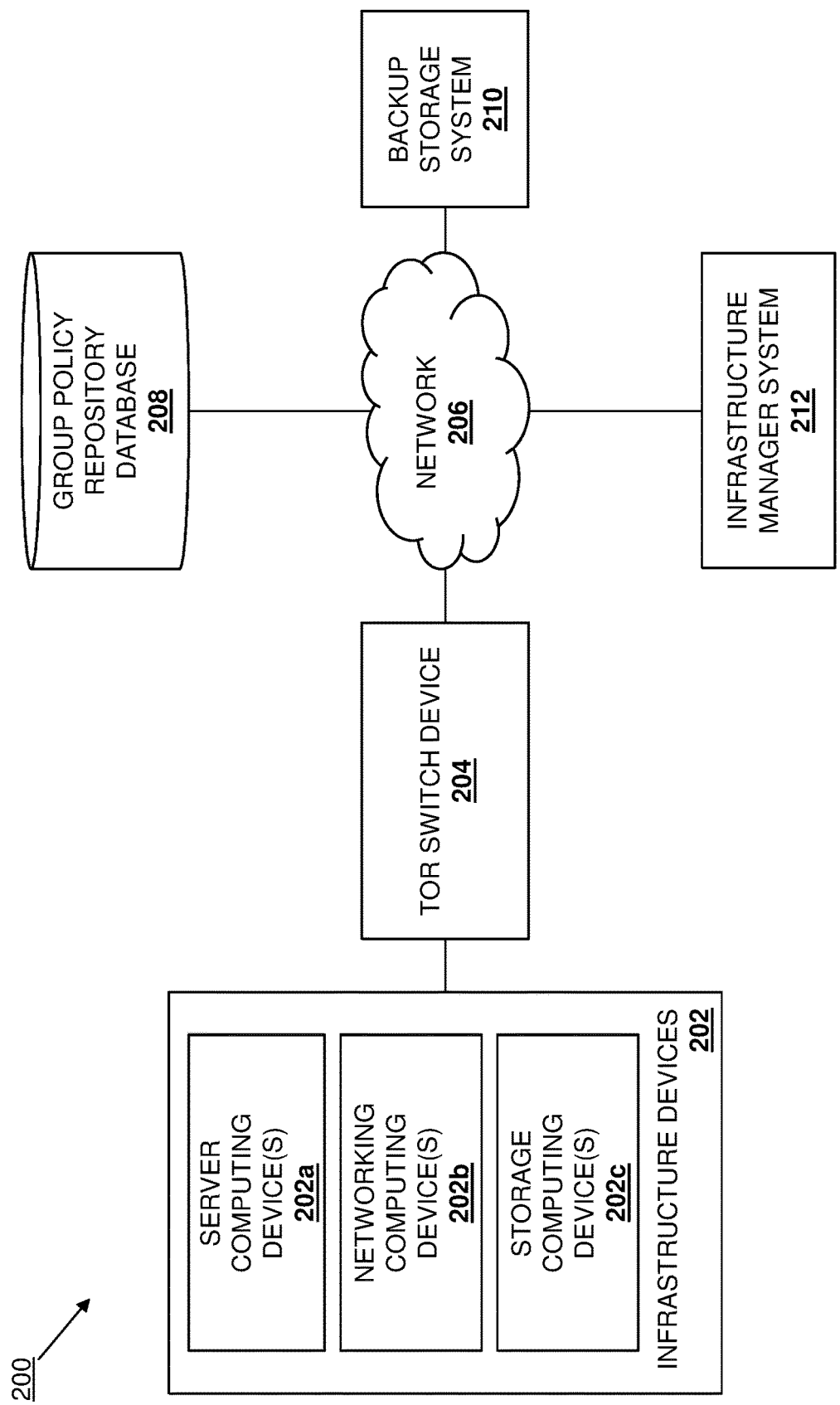
FIG. 2 is a schematic view illustrating an embodiment of an infrastructure backup system.

Referring now to FIG. 2, an embodiment of an infrastructure backup system 200 is illustrated. In the illustrated embodiment, the infrastructure backup system 200 includes a plurality of infrastructure devices 202 that, in the illustrated example, include one or more server computing devices 202a, one or more networking computing devices 202b, and one or more storage computing devices 202c that may be configured to provide a cloud infrastructure system. For example, as discussed above, the server computing device(s) 202a, networking computing device(s) 202b, and/or storage computing device(s) 202c that provide the infrastructure devices 202 may be configured to perform Software Defined Networking (SDN), Software Defined Storage (SDS), and/or other cloud infrastructure functionality that would be apparent to one of skill in the art in possession of the present disclosure. In an embodiment, any of the server computing device(s) 202a, networking computing device(s) 202b, and/or storage computing device(s) 202c included in the infrastructure devices 202 may be provided by the IHS 100 discussed above with reference to FIG. 1, and/or may include some or all of the components of the IHS 100. However, while illustrated and discussed as being provided by server computing device(s), networking computing device(s), and/or storage computing device(s), one of skill in the art in possession of the present disclosure will recognize that devices included in the infrastructure devices 202 in the infrastructure backup system 200 may include any devices that may be configured to operate similarly as the infrastructure devices 202 discussed below.

In the illustrated embodiment, the infrastructure devices 202 are coupled to a Top Of Rack (TOR) switch device 204 that is further coupled to a network 206 such as a Local Area Network (LAN), the Internet, combinations thereof, and/or other networks known in the art. In a specific example, the infrastructure devices 202 provided by the server computing device(s) 202a, networking computing device(s) 202b, and/or storage computing device(s) 202c discussed above may be provided in a rack, with the TOR switch device 204 included in that rack and coupling those infrastructure devices 202 to the network 206. The TOR switch device 204 may be provided by the IHS 100 discussed above with reference to FIG. 1, and/or may include some or all of the components of the IHS 100, and in specific examples may operate as a Software Defined Networking (SDN) node that is responsible for handling communications between the infrastructure devices 202 and other devices and/or systems connected to the network 206 via, for example, the Access Control List (ACL) and Network Address Translation (NAT) management discussed below that implement policy settings defining access to network resources. However, while illustrated and discussed as being provided by a TOR switch device, one of skill in the art in possession of the present disclosure will recognize that devices coupling the infrastructure devices 202 to the network 206 include any devices that may be configured to operate similarly as the TOR switch device 206 discussed below.

In the illustrated embodiment, a policy storage system (not illustrated, but which may include the storage 108 discussed above with reference to FIG. 1) may be coupled to the network 206 and may include a group policy repository database 208 (e.g., an Active Directory) that may store any permission-related and/or authentication-related information that defines which users are authorized to utilize the infrastructure backup system 200. Similarly, a backup storage system 210 may be coupled to the network 206 and configured to store any of the backup data discussed below. Finally, in the illustrated embodiment, an infrastructure manager system 212 is coupled to the network 206. In an embodiment, the infrastructure manager system 212 may be provided by the IHS 100 discussed above with reference to FIG. 1, and/or may include some or all of the components of the IHS 100, and in specific examples may be provided by one or more server computing devices that are configured to collect information about the infrastructure devices 202, including all of the settings used to provide the cloud infrastructure and virtual infrastructure details, as well as perform any of the other operations discussed below. However, while illustrated and discussed as being provided by a server device(s), one of skill in the art in possession of the present disclosure will recognize that infrastructure management systems provided in the infrastructure backup system 200 may include any devices that may be configured to operate similarly as the infrastructure manager system discussed below. As such, while a specific cloud infrastructure backup system 200 has been illustrated and described, one of skill in the art in possession of the present disclosure will recognize that the cloud infrastructure backup system of the present disclosure may include a variety of components and component configurations while remaining within the scope of the present disclosure as well.

Figure 3:
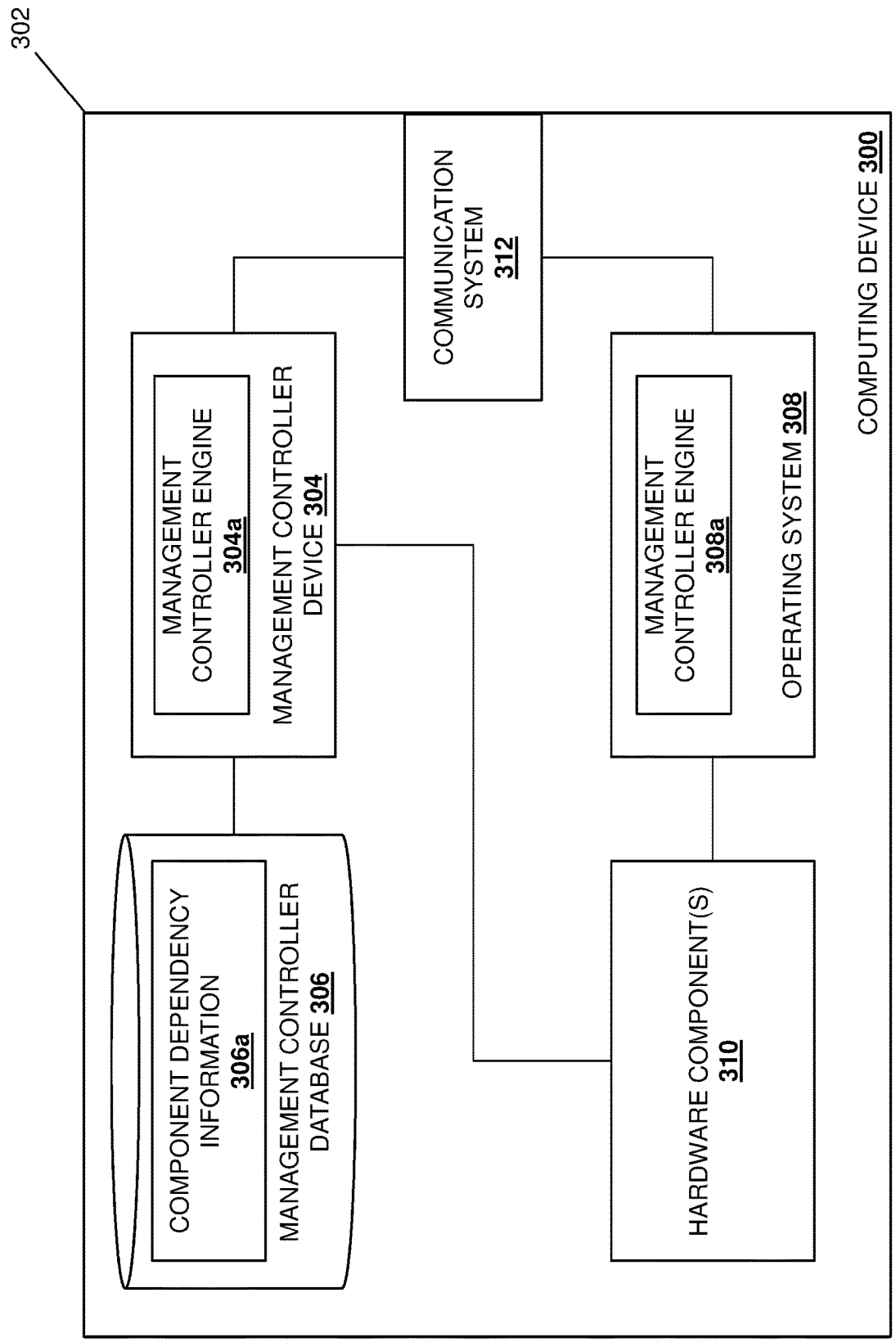
FIG. 3 is a schematic view illustrating an embodiment of a computing device that may be provided in the infrastructure backup system of FIG. 2.

Referring now to FIG. 3, an embodiment of a computing device 300 is illustrated that one of skill in the art in possession of the present disclosure will recognize may provide any of the server computing device(s) 202*a* discussed above with reference to FIG. 2. As such, the computing device 300 may be provided by the IHS 100 discussed above with reference to FIG. 1 and/or may include some or all of the components of the IHS 100. However, while illustrated and discussed as providing a server computing device, one of skill in the art in possession of the present disclosure will recognize that, in some embodiments, the functionality of the computing device 300 discussed below may be provided in other devices (e.g., the networking computing device(s) 202*b*, the storage computing device(s) 202*c*, etc.) that are configured to operate similarly as the computing device 300 discussed below. In the illustrated embodiment, the computing device 300 includes a chassis 302 that houses the components of the computing device 300, only some of which are illustrated below. For example, the chassis 302 may house a management controller device 304 that may be provided by an integrated DELL® Remote Access Controller (iDRAC) available from DELL® Inc. of Round Rock, Tex., United States, a Baseboard Management Controller (BMC), and/or other management controller devices that would be apparent to one of skill in the art in possession of the present disclosure.

In some embodiments, the management controller device 304 may include a management processing system (not illustrated, but which may include the processor 102 discussed above with reference to FIG. 1) and a management memory system (not illustrated, but which may include the memory 114 discussed above with reference to FIG. 1) that is coupled to the management processing system and that includes instructions that, when executed by the management processing system, cause the management processing system to provide a management controller engine 304*a* that is configured to perform the functionality of the management controller engines and/or management controller devices discussed below. The chassis 302 may also house a storage system (not illustrated, but which may include the storage 108 discussed above with reference to FIG. 1) that is coupled to the management controller device 304 (e.g., via a coupling between the storage system and the management controller device 304) and that includes a management controller database 306 that is configured to store component dependency information 306*a* (discussed in further detail below), as well as any other information utilized by the management controller device 304 as discussed below.

In some embodiments, the chassis 302 may also house a primary processing system (not illustrated, but which may include the processor 102 discussed above with reference to FIG. 1) and a primary memory system (not illustrated, but which may include the memory 114 discussed above with reference to FIG. 1) that is coupled to the primary processing system and that includes instructions that, when executed by the primary processing system, cause the primary processing system to provide an operating system 308 that includes a management controller engine 308*a* that is configured to perform the management functionality discussed below for the operating system 308. The chassis 302 may also house one or more hardware components 310, with the management controller device 304 and the operating system 308 each coupled to the hardware component(s) 310 in a manner that allows the management controller engine(s) 304*a* and 308*a* to perform the backup and restoration operations discussed below. In a specific example, the management controller engines 304*a* and 308*a* may provide "desired state configuration managers" that operate to identify changes in hardware and software components in the computing device 300 and, in response, notify the infrastructure manager system 212, with the management controller engine 304*a* operating as a "master management controller", and the management controller engine 308*a* operating as a "slave management controller" that is configured to take over for the "master management controller" in the event it becomes unavailable. However, while a specific example is provided, one of skill in the art in possession of the present disclosure will appreciate that the management functionality discussed below may be provided in a variety of manners that will fall within the scope of the present disclosure as well.

The chassis 302 may also house a communication system 312 that is coupled to the management controller device 304 and the operating system 308 (e.g., via a coupling between the communication system 308 and each of the management processing system and primary processing system), and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. However, while a specific computing device 300 has been illustrated, one of skill in the art in possession of the present disclosure will recognize that computing devices (or other devices operating according to the teachings of the present disclosure in a manner similar to that described below for the computing device 300) may include a variety of components and/or component configurations for providing conventional computing device functionality, as well as the functionality discussed below, while remaining within the scope of the present disclosure as well.

Figure 4:
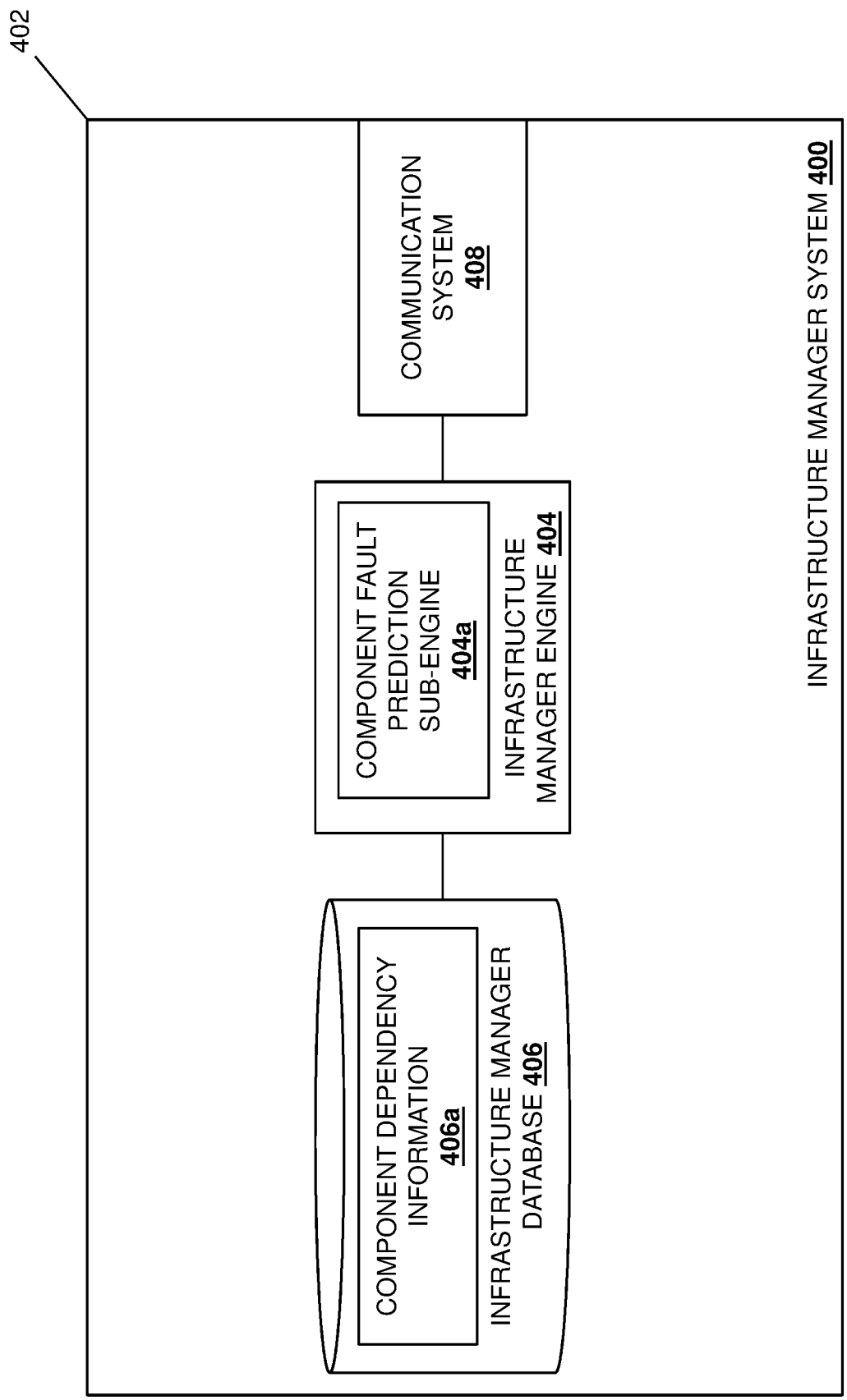
FIG. 4 is a schematic view illustrating an embodiment of an infrastructure manager system that may be provided in the infrastructure backup system of FIG. 2.

Referring now to FIG. 4, an embodiment of infrastructure manager system 400 is illustrated that may provide the infrastructure manager system 212 discussed above with reference to FIG. 2. As such, the infrastructure manager system 400 may be provided by the IHS 100 discussed above with reference to FIG. 1 and/or may include some or all of the components of the IHS 100, and in specific examples may include one or more server computing devices. Furthermore, while illustrated and discussed as being provided by server computing device(s), one of skill in the art in possession of the present disclosure will recognize that the functionality of the infrastructure manager system 400 discussed below may be provided by other devices that are configured to operate similarly as the infrastructure manager system 400 discussed below. In the illustrated embodiment, the infrastructure manager system 400 includes a chassis 402 that houses the components of the infrastructure manager system 400, only some of which are illustrated below. For example, the chassis 402 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide an infrastructure manager engine 404 that is configured to perform the functionality of the infrastructure manager engines and/or infrastructure manager systems discussed below.

For example, in the illustrated embodiment, the infrastructure manager engine 404 includes a component fault prediction sub-engine 404a that may be provided by one or more Artificial Intelligence (AI) algorithms/engines that are configured to analyze alerts and/or error patterns generated by the hardware and/or software components in the infrastructure devices 202 and predict future failures of those hardware and/or software components, the likely root causes of those predicted failures, and/or other predictive failure information that would be apparent to one of skill in the art in possession of the present disclosure. For example, the component fault prediction sub-engine 404a may run in the background of the infrastructure manager system 400 to perform predictions of non-correctable errors and/or component failures using error patterns, alerts generated by the management controller devices included in server computing devices, alerts generated by the operating systems included in server computing devices, and alerts generated by a cluster coordinator that may be provided in the infrastructure manager system 400 (or that may be connected to the infrastructure manager system 212/400 via the network 206), and that may operate to coordinate cloud infrastructure operations by coordinating between nodes (e.g., by bringing up a second node when a first node becomes unavailable, performing replication, adding nodes, storing logs, etc.).

The chassis 402 may also house a storage system (not illustrated, but which may include the storage 108 discussed above with reference to FIG. 1) that is coupled to the infrastructure manager engine 404 (e.g., via a coupling between the storage system and the processing system) and that includes an infrastructure manager database 406 that is configured to store component dependency information 406a (discussed in further detail below), as well as any other information utilized by the infrastructure manager engine 404 discussed below. The chassis 402 may also house a communication system 408 that is coupled to the infrastructure manager engine 404 (e.g., via a coupling between the communication system 408 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. However, while a specific infrastructure manager system 400 has been illustrated, one of skill in the art in possession of the present disclosure will recognize that infrastructure manager systems (or other devices operating according to the teachings of the present disclosure in a manner similar to that described below for the infrastructure manager system 400) may include a variety of components and/or component configurations for providing conventional infrastructure manager functionality, as well as the functionality discussed below, while remaining within the scope of the present disclosure as well.

Figure 5:
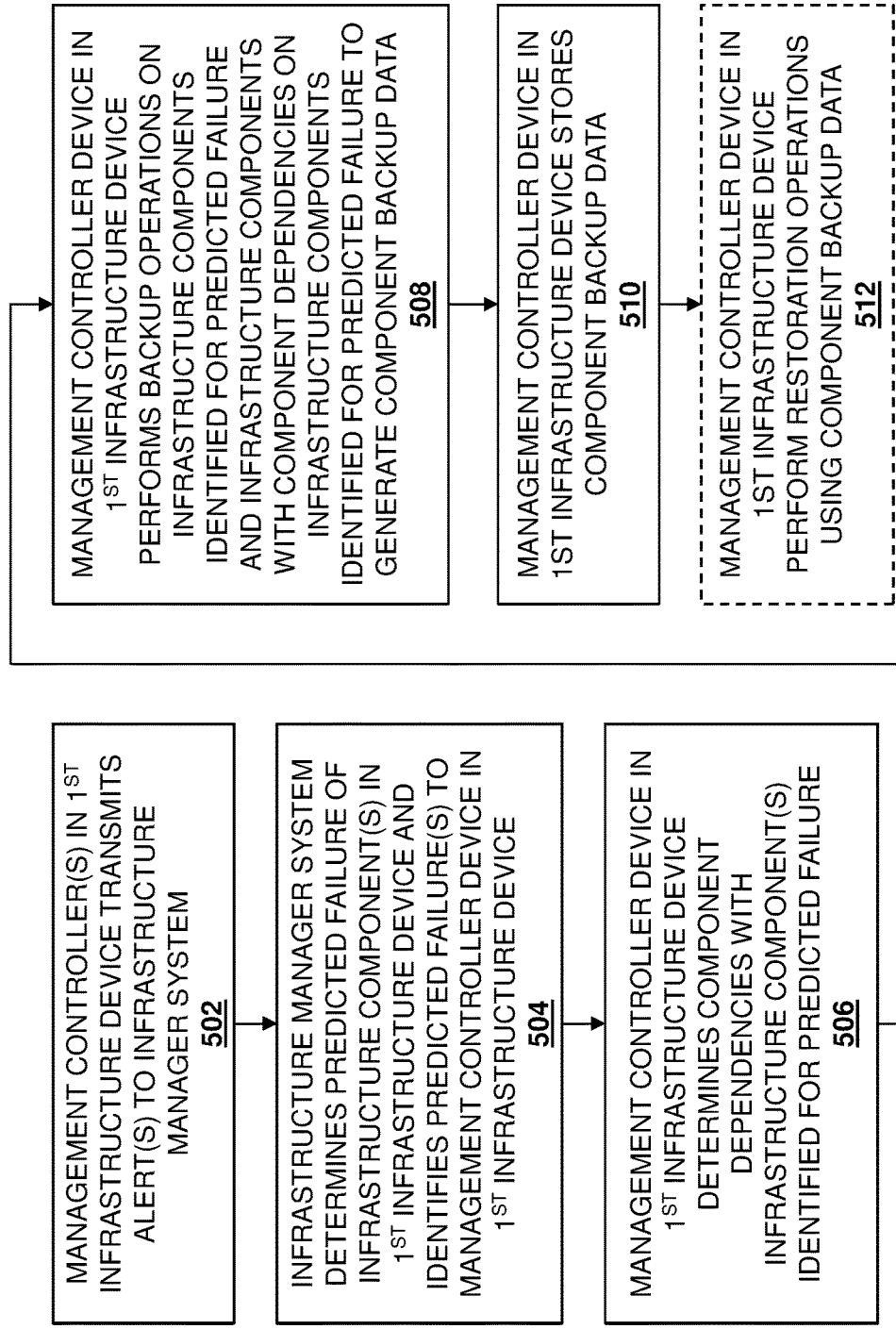
FIG. 5 is a flow chart illustrating an embodiment of a method for backing up an infrastructure.

Referring now to FIG. 5, an embodiment of a method 500 for backing up infrastructure components is illustrated. As discussed below, the systems and methods of the present disclosure provide for the backing up of components utilized to provide a cloud infrastructure system based on dependencies between those components and in response to a predicted failure of one or more of those components, which results in hardware and software component-synchronized backup data for components in the cloud infrastructure system that may be used to restore the cloud infrastructure system in the event it becomes unavailable. For example, the infrastructure backup system of the present disclosure may include an infrastructure manager system coupled to infrastructure devices via a network, with a first infrastructure device including a management controller database that stores component dependency information that identifies at least one dependency between a first component that is included in the first infrastructure device and a second component that is included in a second infrastructure device. A management controller device in the first infrastructure device operates receive an identification of a predicted failure for the first component via the network from the infrastructure manager system and, based on the identification of the predicted failure for the first component, performs first backup operations on the first component to generate first component backup data. Furthermore, based on the component dependency information that identifies at least one dependency between the first component and the second component, the management controller device performs second backup operations on the second component to generate second component backup data, and transmits the first component backup data and the second component backup data via the network for storage on a backup storage system. In the event of the subsequent unavailability of the cloud infrastructure system, the management controller device in the first infrastructure device may retrieve the first component backup data and the second component backup data and use it to restore the cloud infrastructure to its most recent state.

In some embodiments, during or prior to the method 500, component dependency information may be generated and stored in the computing device 300 and the infrastructure manager device 400. For example, the component dependency information 306a and 406a discussed above may be provided in a template (e.g., a metadata template) or other data structure and may describe relationships between hardware and/or software components (e.g., the hardware and software stack) included in the infrastructure devices 202. For example, cloud infrastructure system vendors/providers may generate the component dependency information for cloud infrastructure hardware and/or software (e.g., the ASURE® stack hub provided by MICROSOFT® Corporation of Redmond, Wash., United States; a Virtual Storage Area Network (VSAN) available from VMWARE® of Palo Alto, Calif., United States; VXRAIL® available from DELL® Inc. of Round Rock, Tex., United States; etc.) that identifies and defines dependencies between components provided in a cloud infrastructure system. Furthermore, the component dependency information provided by the cloud infrastructure system vendors/providers may be supplemented with more detail to provide and/or enhance a component dependency matrix provided by the component dependency information, with information from the hardware and software stack combined to create the metadata template discussed above that may include configuration data, settings data, and/or other data utilized with the hardware and/or software components to provide the cloud infrastructure functionailty.

To provide a specific example, component dependency information for a hard disk drive configured as part of a Redundant Array of Independent Disks (RAID), a virtual hard disk drive, and a software setting that provide a partition on the hard disk drive, may be provided as follows:

```
{
    "Component": "hard disk"
    {
        "Settings" :[
            "Raid": "Raid 0",
            "Virtual Disk": "5",
            "Capacity": "5TB"
        ] }
        ,
        "Software" :[
            "Partition": "Auto"
        ]
    }
```

Similarly, for a hardware component such as a Network Interface Controller (NIC), networking card, and/or other networking component, the component dependency information may identify a hypervisor software component that provides a virtual NIC (vNIC) using the NIC, a hard disk, and/or network settings. Similarly as well, for Internet browser software components or application software components, the component dependency information may identify user profile specific data, favorites data, bookmark data, application settings, and/or any related custom settings that one of skill in the art would recognize as being associated with an Internet browser or application. As such, while a few specific examples are provided above, one of skill in the art in possession of the present disclosure will recognize that the component dependency information may identify a variety of component dependencies for any of a variety of hardware or software components while remaining within the scope of the present disclosure.

In a specific example of the generation and supplementation of the component dependency information, a "dependency graph" of hardware and software components may be generated using a template that identifies the hardware and/or software dependencies, with the cloud infrastructure system vendors/providers providing details such as a number of infrastructure devices (or "nodes") in the cloud infrastructure system, types of storage computing devices 202c in the cloud infrastructure system, types of networking computing devices 202b in the cloud infrastructure system (e.g., types of NICs, types of switch devices, etc.), and/or other infrastructure device information that would be apparent to one of skill in the art in possession of the present disclosure. Furthermore, during the building of the cloud infrastructure system provided by the infrastructure devices 202, the user (e.g., a deployment engineer) may verify the components identified in the template by the cloud infrastructure system vendors/providers, and in some situations may define component relationships (e.g., storage provided by hard disks, vNICs provided by NICs, server/switch configuration information, other component information, etc.). Thus, the component dependency information may provide any details about the hardware and software components in the cloud infrastructure system and their dependencies on each other. For example, some of the embodiments discussed below describe how the component dependency information may identify port configurations on the TOR switch device 204 that are dependent on their attached NICs included in the server computing devices 202a to allow those server computing devices 202a to communicate via the network 206.

As discussed above, the component dependency information may be provided in the management controller database 306 (e.g., as the component dependency information 306a) and in the infrastructure manager database 406 (e.g., as the component dependency information 406a), and the component dependency information 306a and 406a may be periodically synchronized as well. In some embodiments, the infrastructure management engine 404 in the infrastructure manager device 212/400 may operate to synchronize metadata information, collect inventory information about the infrastructure devices 202 that provide the cloud infrastructure system (e.g., using information available from the operating system 308, the management controller device 304, etc.), and/or perform other operations to ensure the component dependency information 306a and 406a accurately describes the cloud infrastructure system provided by the infrastructure devices 202. In a specific example, the management controller engine 304a in the management controller device 304 may collect inventory information about the components in the computing device 300/server computing device 202a (including the networking computing devices 202b and storage computing devices 202c connected to the server computing device 202a), as well as information from the operating system 308 that describes other devices connected to the computing device 300/server computing device 202a (e.g., via an Intelligent Platform Management Interface (IPMI) channel using the Link Layer Discovery Protocol (LLDP)), store that information as part of the component dependency information 306a in the management controller database 306, and synchronize its component dependency information 306a with the component dependency information 406a stored in the infrastructure manager system 212/300.

Figure 6A:
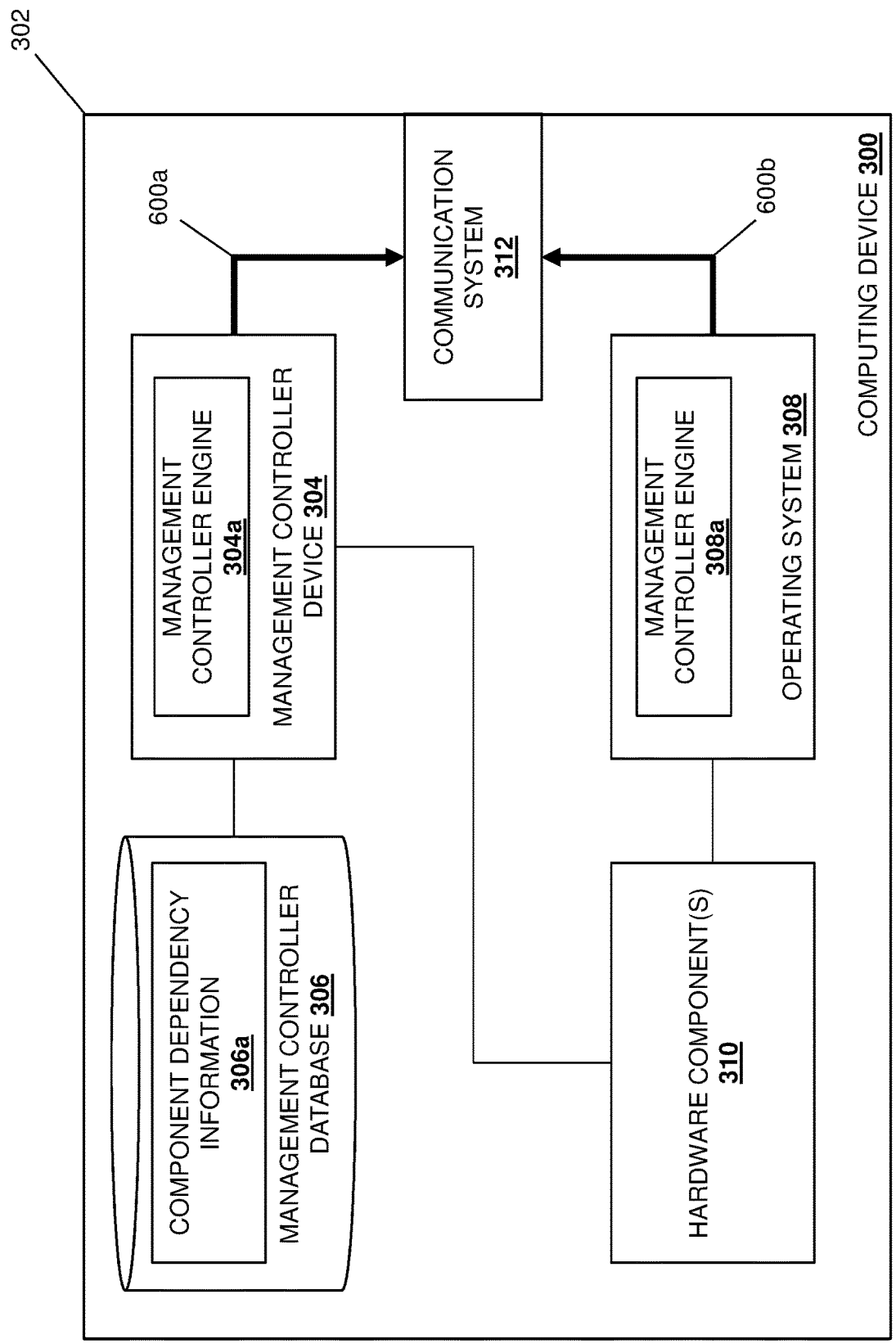
FIG. 6A is a schematic view illustrating an embodiment of the computing device of FIG. 3 operating during the method of FIG. 5.
Figure 6B:
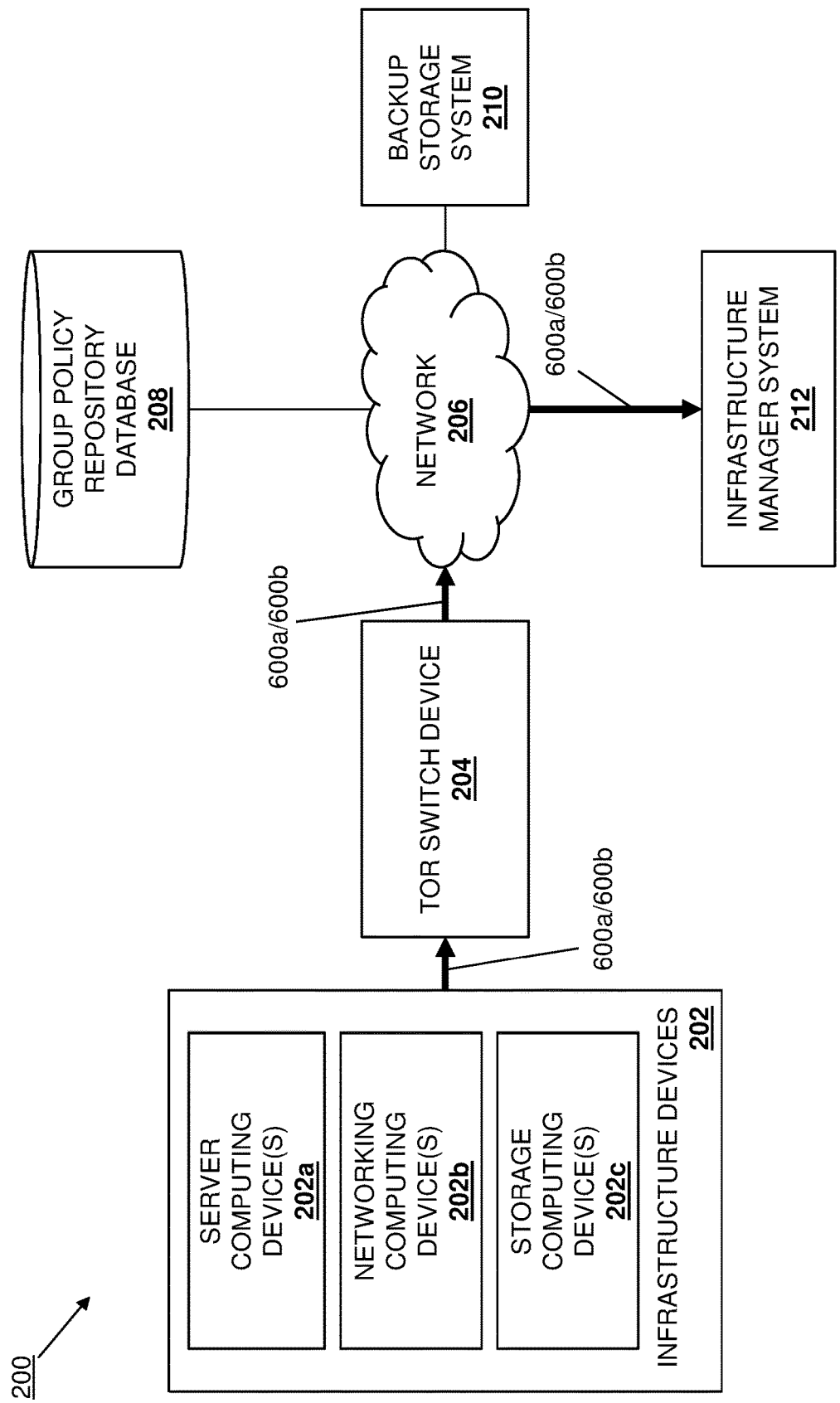
FIG. 6B is a schematic view illustrating an embodiment of the infrastructure backup system of FIG. 2 operating during the method of FIG. 5.

The method 500 begins at block 502 where management controller(s) in a first infrastructure device transmit one or more alerts to an infrastructure manager system. With reference to FIG. 6A, in an embodiment of block 502, the management controller engine 304a in the management controller device 304 may operate to perform hardware alert transmission operations 600a, and the management controller engine 308a in the operating system 308 may operate to perform software alert transmission operations 600b, in order to transmit hardware component alerts and software component alerts via the communication system 312 to the TOR switch device 204, and the TOR switch device 204 may then operate to forward those hardware component alerts and software component alerts via the network 206 to the infrastructure manager system 212. As such, at block 502, the infrastructure manager engine 404 in the infrastructure manager system 212/400 may receive the hardware component alerts and software component alerts via its communication system 408. Furthermore, while not illustrated in FIGS. 6A and 6B, a cluster coordinator that is included in the infrastructure manager system 212/400 (or coupled to the infrastructure manager system 212/400 via the network 206) may also generate alerts associated with the infrastructure devices 202 and transmit those alerts to the infrastructure manager engine 404 as well.

In different embodiments, the hardware component alerts and software component alerts may be generated in response to errors occurring in corresponding hardware components and software components, in response to changes in the configurations of corresponding hardware components and software components, and/or in response to any of alert situations that would be apparent to one of skill in the art in possession of the present disclosure. In some embodiments, the management controller engine 304a in the management controller device 304, and the management controller engine 308a in the operating system 308, may only transmit hardware component alerts and software component alerts based on errors when an error severity of the corresponding error exceeds a threshold. Furthermore, while the management controller engines 304a and 308a are illustrated as transmitting hardware component alerts and software component alerts separately to the infrastructure manager system 212, as discussed above the management controller engine 304a may operate as a "master" and the management controller engine 308a may operate as a "slave", with the management controller engine 308a providing the software component alerts discussed above to the management controller engine 304a, and the management controller engine 304a transmitting both hardware component alerts and software component alerts to the infrastructure manager system 212. As will be appreciated by one of skill in the art in possession of the present disclosure, the hardware alert transmission operations 600a and software alert transmission operations 600b may be performed periodically in response to the alert situations discussed above to allow the infrastructure manager engine 404 in the infrastructure manager system 212/400 to collect a history of hardware component alerts and software component alerts that may be stored in the infrastructure manager database 406.

The method 500 then proceeds to block 504 where the infrastructure manager system determines a predicted failure of one or more infrastructure components in the first infrastructure device, and identifies the predicted failure(s) to the management controller device in the first infrastructure device. In an embodiment, at block 504, the component fault prediction sub-engine 404a in the infrastructure manager engine 404 may operate to analyze the history of hardware component alerts and software component alerts stored in the infrastructure manager database 406 in order to predict a failure of one or more components in one of the infrastructure devices 202. As discussed above, the component fault prediction sub-engine 404a may operate in the background of the infrastructure manager system 212/400 to analyze the history of hardware component alerts and software component alerts (e.g., patterns of errors and/or other alerts generated by the management controllers in the infrastructure devices 202) in order to predict non-correctable errors that may result in the failure of components in the infrastructure device(s) 202, and one of skill in the art in possession of the present disclosure will appreciate that a variety of predictive failure techniques may be utilized at block 504 in order to predict failures in the components in the infrastructure device(s) 202. For example, the predictive failure analysis performed by the component fault prediction sub-engine 404a may be derived from Failure Mode and Effect Analysis (FMEA), WINDOWS® Hardware Error Analysis (WHEA) provided in WINDOWS® drivers platforms for the detection of failure in hardware components, AZURE® machine learning using cloud disk error forecasting in AZURE® systems for live migration of Virtual Machines (VMs) and workloads, and/or other predictive failure techniques that would be apparent to one of skill in the art in possession of the present disclosure.

For example, predicted failures of components in the infrastructure device(s) 202 may result from estimated remaining lifetimes that are determined for those components by the component fault prediction sub-engine 404a, with a predicted failure identified when the estimated remaining lifetime of a component is less than a threshold lifetime for that component. As discussed above, one or more AI algorithms/engines may be utilized by the component fault prediction sub-engine 404a to analyze the history of hardware component alerts/error patters and software component alerts/error patterns at the hardware and software level in order to predict a future component failure (as well as the root causes of those failures). As such, non-correctable error/failure dates may be predicted for each component in the infrastructure devices 202 that provide the cloud infrastructure system 212, and may be stored in a predicted failure table, an example of which is provided below:

| COMP. TYPE | COMP. DETAILS | MODEL | LAST HEALTH CHECK | STATUS | LAST BACKUP | LAST BACKUP LOCATION | PREDICTED LIFE | TIME LEFT TO REPLACE COMP |
|---|---|---|---|---|---|---|---|---|
| SW | | | DATE/TIME | HEALTHY | DATE/TIME | UNC PATH | DATE | DAYS LEFT |
| HW | | | DATE/TIME | HEALTHY | DATE/TIME | UNC PATH | DATE | DAYS LEFT |
| SW | | | DATE/TIME | FAULTY | DATE/TIME | UNC PATH | DATE | DAYS LEFT |
| HW | | | DATE/TIME | FAULTY | DATE/TIME | UNC PATH | DATE | DAYS LEFT |

As such, for each hardware ("HW") and software ("SW") component, details about that component, a model number for that component, a date and time of the most recent health check for that component, a health status of that component, a date and time of the last backup for that component, a location of the last backup for that component, a predicted life for that component, and a time left to replace that component may be tracked in the predicted failure table above. In some embodiments, the predictive failure analysis discussed above may only be performed for hardware components and/or software components that have been designated as critical, a designation of which may be configured by a user or cloud infrastructure administrator to cover only particular component in the infrastructure devices 202.

Figure 7A:
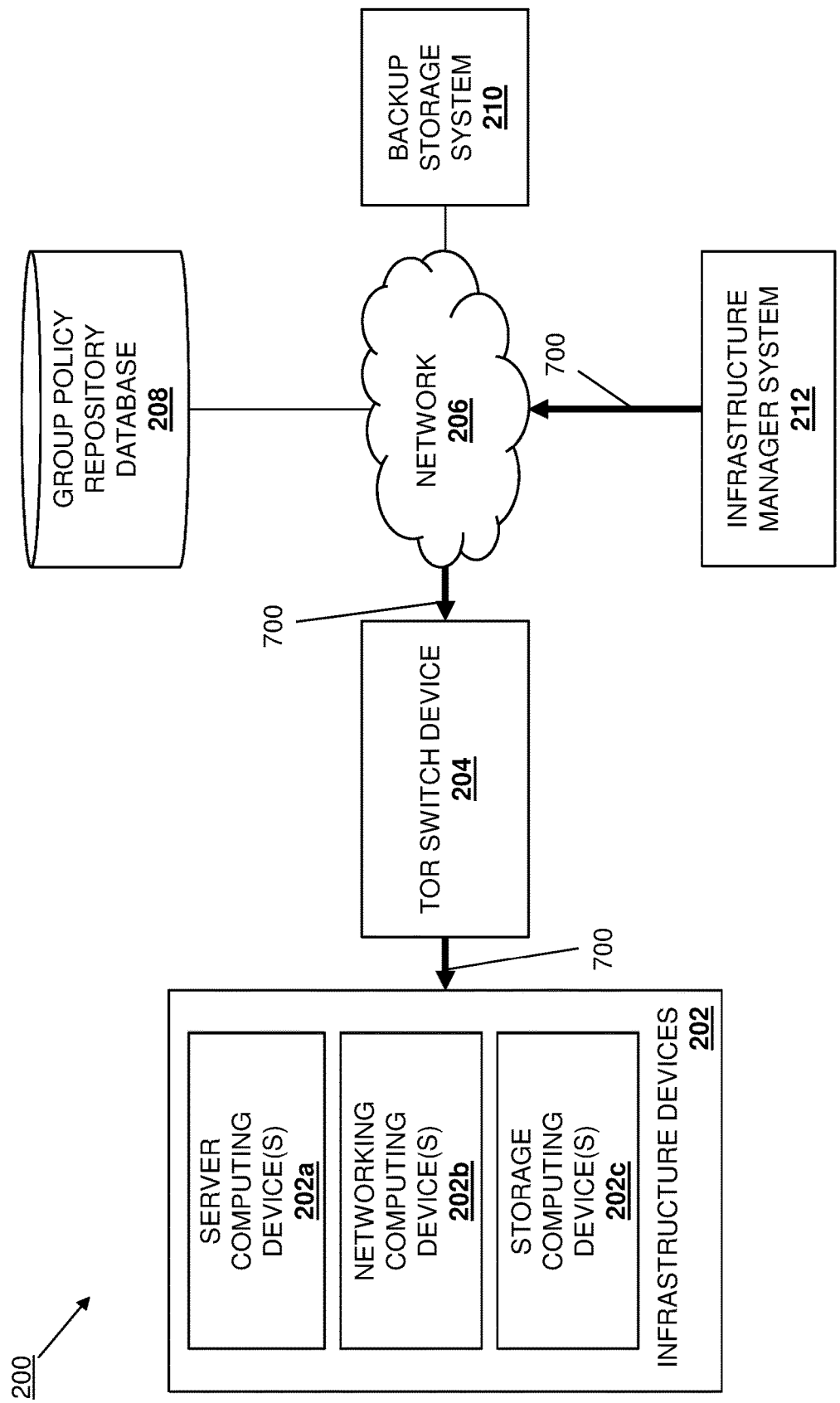
FIG. 7A is a schematic view illustrating an embodiment of the infrastructure backup system of FIG. 2 operating during the method of FIG. 5.
Figure 7B:
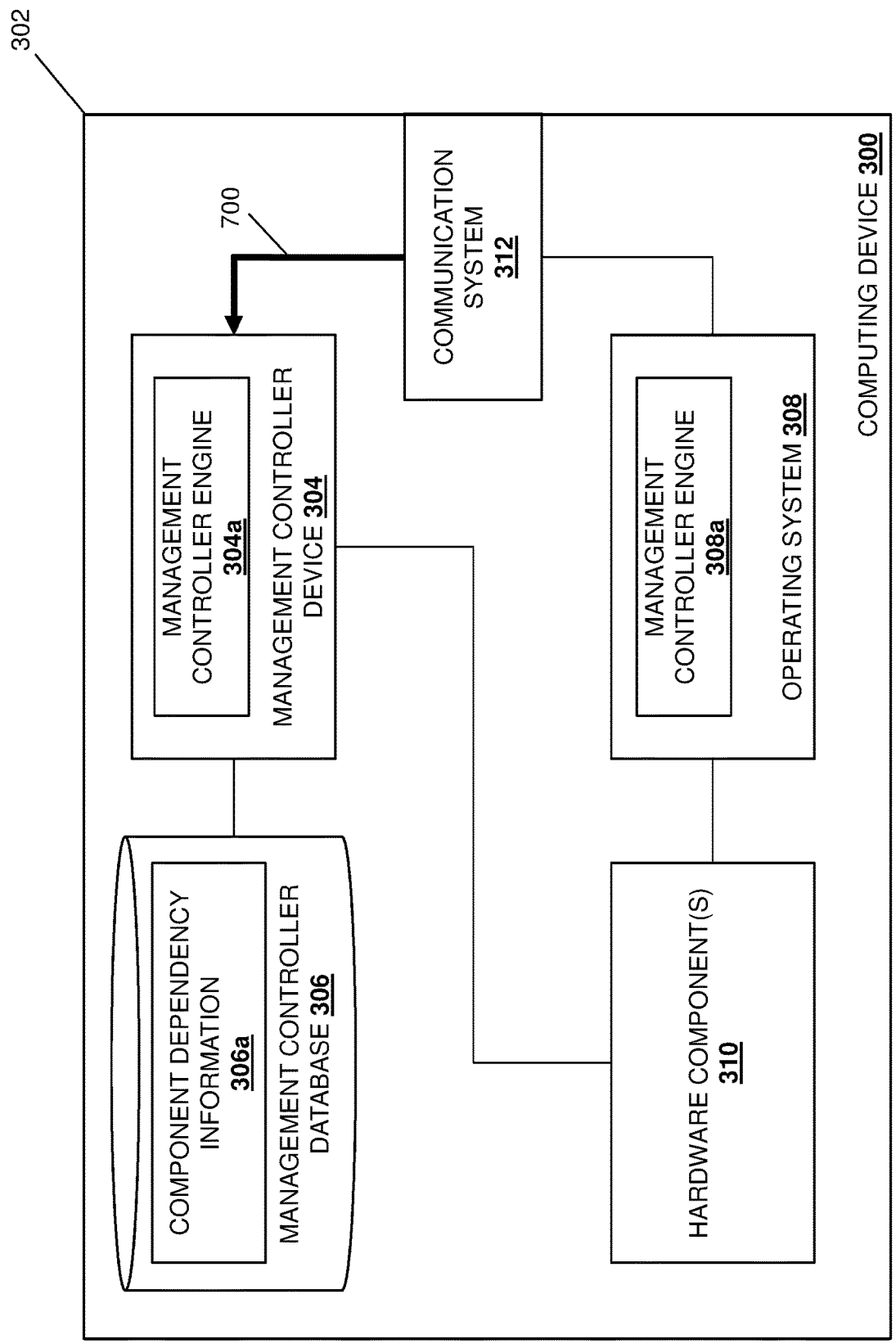
FIG. 7B is a schematic view illustrating an embodiment of the computing device of FIG. 3 operating during the method of FIG. 5.

Thus, based on the predictive failure analysis discussed above, a backup date and time may be generated that will define when backup operations for any particular component in the infrastructure devices 202 should be performed. With reference to FIGS. 7A and 7B, in an embodiment of block 504, the infrastructure manager engine 404 in the infrastructure manager system 212/400 may then monitor the predicted lifetimes for the components in the infrastructure devices 202 to determine whether the remaining life for any particular component is below a threshold and, in the event the remaining life for any particular component is below the threshold, may perform predicted failure alert operations 700 that include generating a predicted failure alert for that component and transmitted that predicted failure alert via the its communication system 408 and through the network 206 to the TOR switch device 204, which will operate to forward that predicted failure alert to the infrastructure device 202 including that component. As such, the management controller engine 304a in the management controller device 304 included in the computing device 300 (which is the infrastructure device 202 including the component for which a failure is predicted in this example) may receive the predicted failure alert via its communication system 312 at block 504

However, in other embodiments, the infrastructure manager engine 404 in the infrastructure manager system 212/400 may transmit the predicted lifetimes for the components in the infrastructure devices 202 to the management controller device(s) 304 in the server computing device(s) 202a, and management controller device(s) may monitor the predicted lifetimes for the components in the infrastructure devices 202 to determine whether the remaining life for any particular component is below a threshold and, in the event the remaining life for any particular component is below the threshold, may identify a predicted component failure. As such, the management controller engine 304a in the management controller device 304 included in the computing device 300 (which is the infrastructure device 202 including the component for which a failure is predicted in this example) may identify a predicted failure of a component at block 504. As will be appreciated by one of skill in the art in possession of the present disclosure, the predicted failure identified at block 504 may cause the performance of the backup operations associated with the component for which the failure is predicted.

Figure 7C:
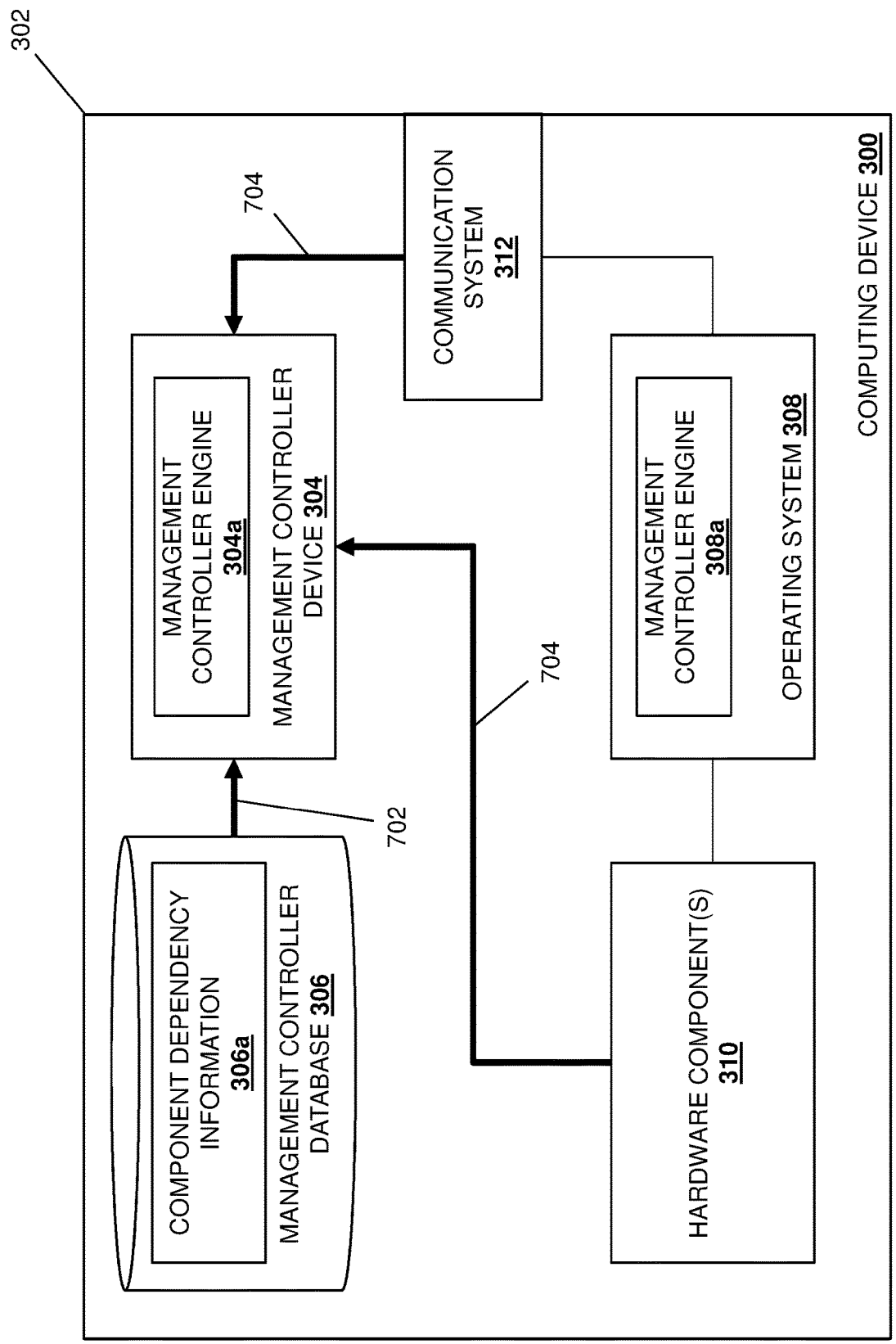
FIG. 7C is a schematic view illustrating an embodiment of the computing device of FIG. 3 operating during the method of FIG. 5.

The method 500 then proceeds to block 506 where the management controller in the first infrastructure device determines component dependencies with the infrastructure component(s) identified for predicted failure. With reference to FIG. 7C, in an embodiment of block 506, the management controller engine 304a in the management controller device 304 may perform component dependency determination operations 702 that include accessing the component dependency information 306a and determining components that are dependent on the component for which the predicted failure alert was received (or predicted failure was otherwise identified) at block 504. For example, in the event a predicted failure alert for a NIC in the computing device 300 was received at block 504, the management controller engine 304a in the management controller device 304 may perform the component dependency determination operations 702 to access the component dependency information 306a to determine that port switch settings on the TOR switch device 204 are dependent on the NIC for which the predicted failure alert was received at block 504. However, while a greatly simplified example related to a NIC/TOR switch device dependency is provided herein, one of skill in the art in possession of the present disclosure will appreciate that a variety of components dependencies may be determined at block 506 based on a component for which a predicted failure alert has been received or a predicted failure is identified.

The method 500 then proceeds to block 508 where the management controller in the first infrastructure device performs backup operations on the infrastructure component(s) identified for predicted failure, and on infrastructure component(s) with component dependencies on the infrastructure component(s) identified for predicted failure, in order to generate component backup data. As will be appreciated by one of skill in the art in possession of the present disclosure, during or prior to the method 500, at least one backup operation may be performed on all of the infrastructure devices 202 that provide the cloud infrastructure system, with associated backup data collected during that backup operation stored in the backup storage system 210. As such, the backup operations performed at block 508 may operate to collect backup data for a subset of the components in the infrastructure devices 202 that are either predicted to fail, or dependent on a component that is predicted to fail, as per the blocks 502-506 of the method 500 discussed above.

With reference to FIG. 7C, in an embodiment of block 508, the management controller engine 304a in the management controller device 304 may perform backup operations 704 that include retrieving backup data for the component for which the predicted failure alert was received at block 504, and retrieving backup data for any components that were determined at block 506 to be dependent on the component for which the predicted failure alert was received. For example, continuing with the example of the predicted failure of a NIC in the computing device 300, the backup operations 704 may include retrieving backup data for the NIC for which the predicted failure alert was received at block 504 (i.e., the backup operations 704 between the hardware component(s) 310 and the management controller device 304 in FIG. 7C), and retrieving backup data for the port settings on the TOR switch device 204 determined at block 506 to be dependent on the NIC for which the predicted failure alert was received (i.e., the backup operations 704 between the communication system 312 and the management controller device 304 in FIG. 7C that access the TOR switch device 204 for the port settings). As will be appreciated by one of skill in the art in possession of the present disclosure, the backup operations 704 may retrieve any of a variety of metadata, configuration data, settings data, and/or other backup data for the component that is predicted to fail and the components dependent on the component that is predicted to fail, while remaining within the scope of the present disclosure.

In some embodiments, the backup operations 704 at block 508 may be optimized to only collect backup data for a subset of components in the infrastructure devices 202 that has changed since previous backup operations performed on those components. Furthermore, in some embodiments, the backup operations at block 508 may be enabled via ACL modifications performed by the infrastructure manager system 212 to bridge access between the management network utilized by the management controller device 304 and a host infrastructure network upon which workloads are performed (e.g., via synchronization of ACL(s) between the TOR switch device 204 and the management controller device 304), which may be performed at a root user security context in order to avoid any disruption to the infrastructure backup system 200. For example, the infrastructure manager system 212 may operate to generate an event with a required payload on the SDN node provided by the TOR switch device 204, which one of skill in the art in possession of the present disclosure will recognize may be used to enable communications by the management controller device 304 (which typically communicates only on a management network via the use of ACLs) with the infrastructure manager system 212 (which typically communicates only on the host infrastructure network via the use of ACLs).

Figure 7D:
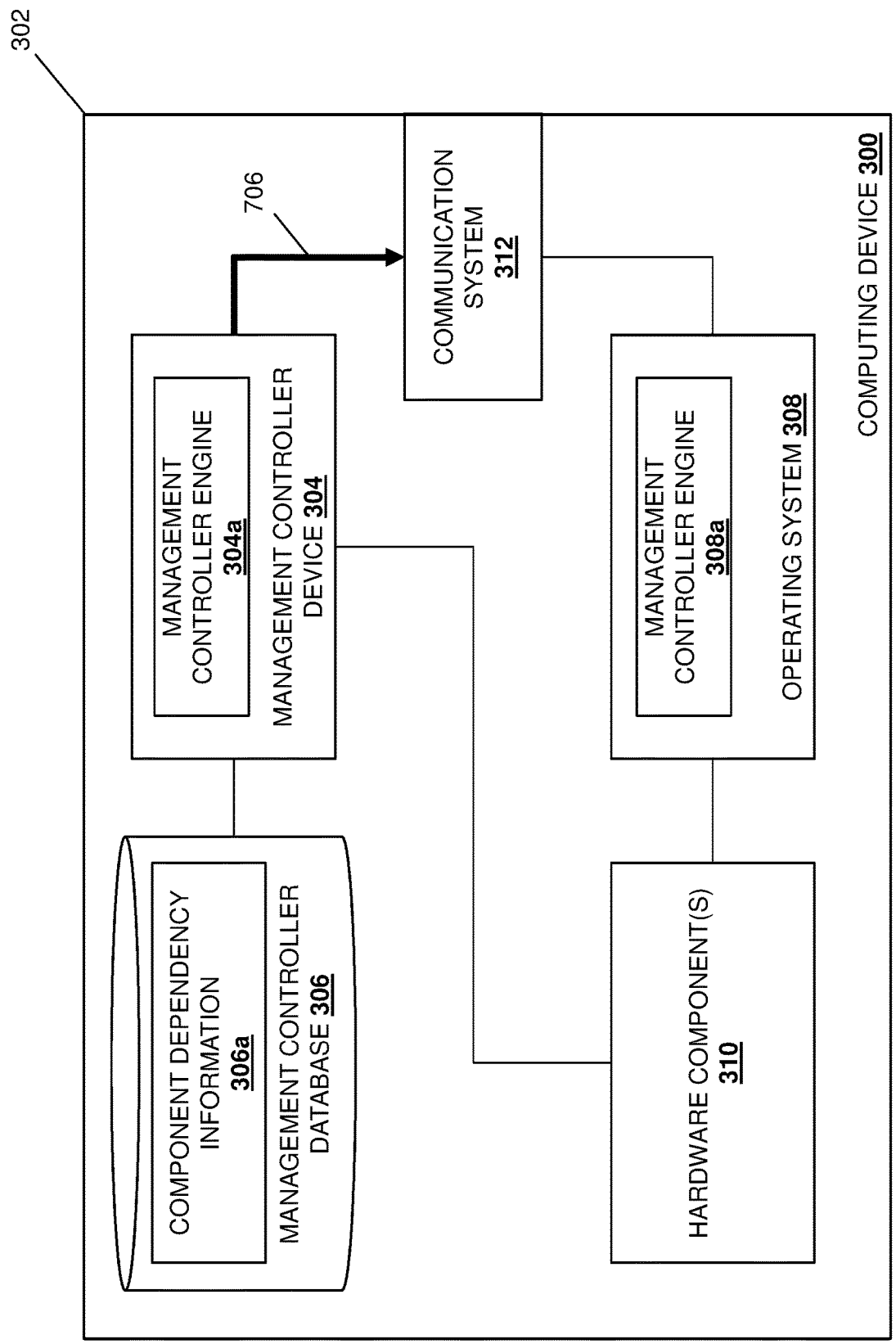
FIG. 7D is a schematic view illustrating an embodiment of the computing device of FIG. 3 operating during the method of FIG. 5.
Figure 7E:
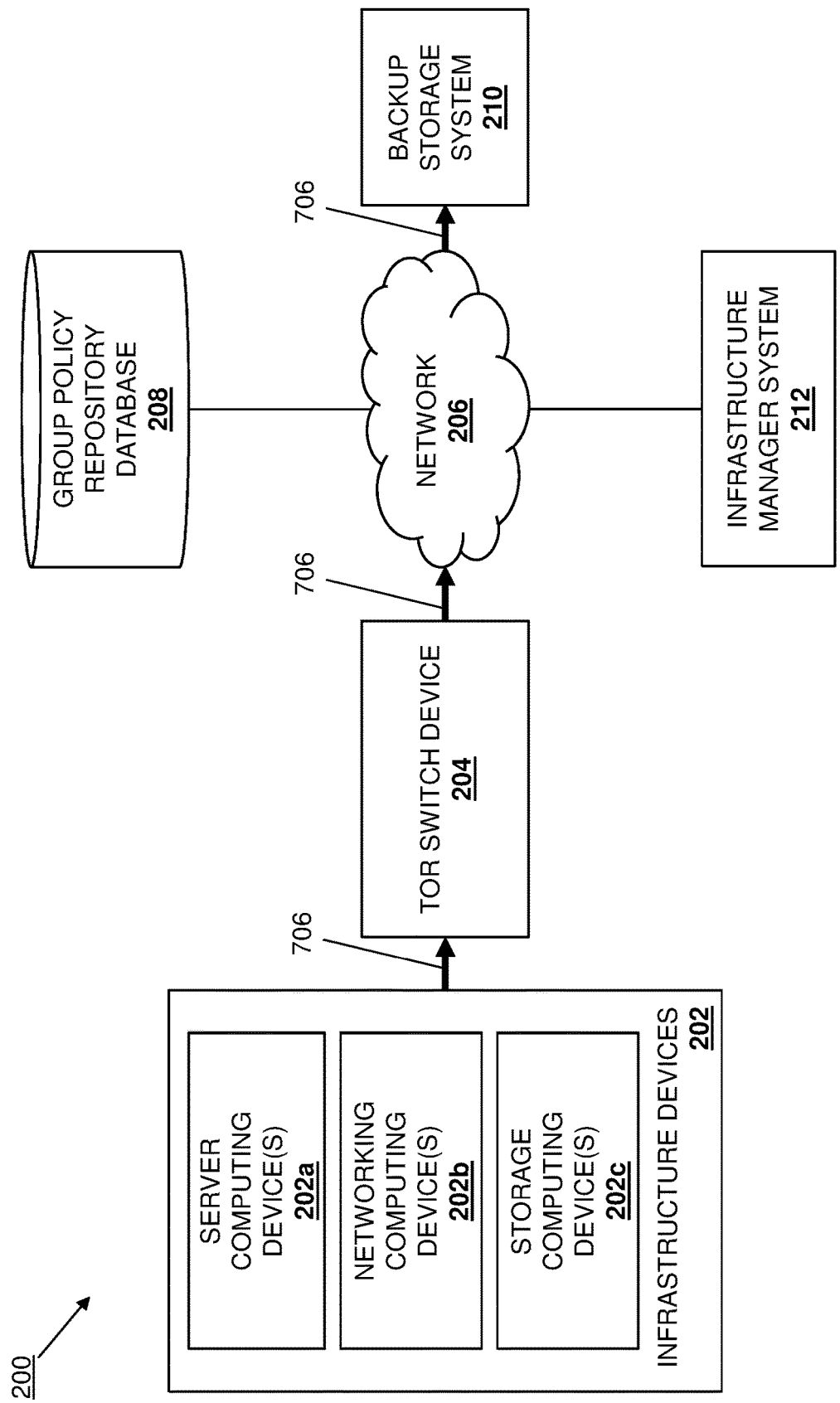
FIG. 7E is a schematic view illustrating an embodiment of the infrastructure backup system of FIG. 2 operating during the method of FIG. 5.

The method 500 then proceeds to block 510 where the management controller in the first infrastructure device stores the component backup data. With reference to FIGS. 7D and 7E, in an embodiment of block 510, the management controller engine 304a in the management controller device 304 may operate to perform backup data storage operations 706 to transmit the backup data collected at block 508 via its communication system 312 to the TOR switch device 204, which then transmits that backup data via the network 206 for storage in the backup storage system 210. For example, the backup data may include a configuration snapshot provided in JavaScript Object Notation (JSON) format, may be encrypted using a host key for security purposes, and may be transmitted to a particular storage location in the backup storage system 210 based on user specifications. Similarly as discussed above, the ACL modifications may be performed to allow the management controller device 304 to access the backup storage system 210, and following the backup storage operations, the ACL modifications may be reversed and/or otherwise undone. Furthermore, as discussed above, the backup data may be incremental, with only the changes in backup data since the most recent previous backup operation provided for storage at block 510.

Figure 8A:
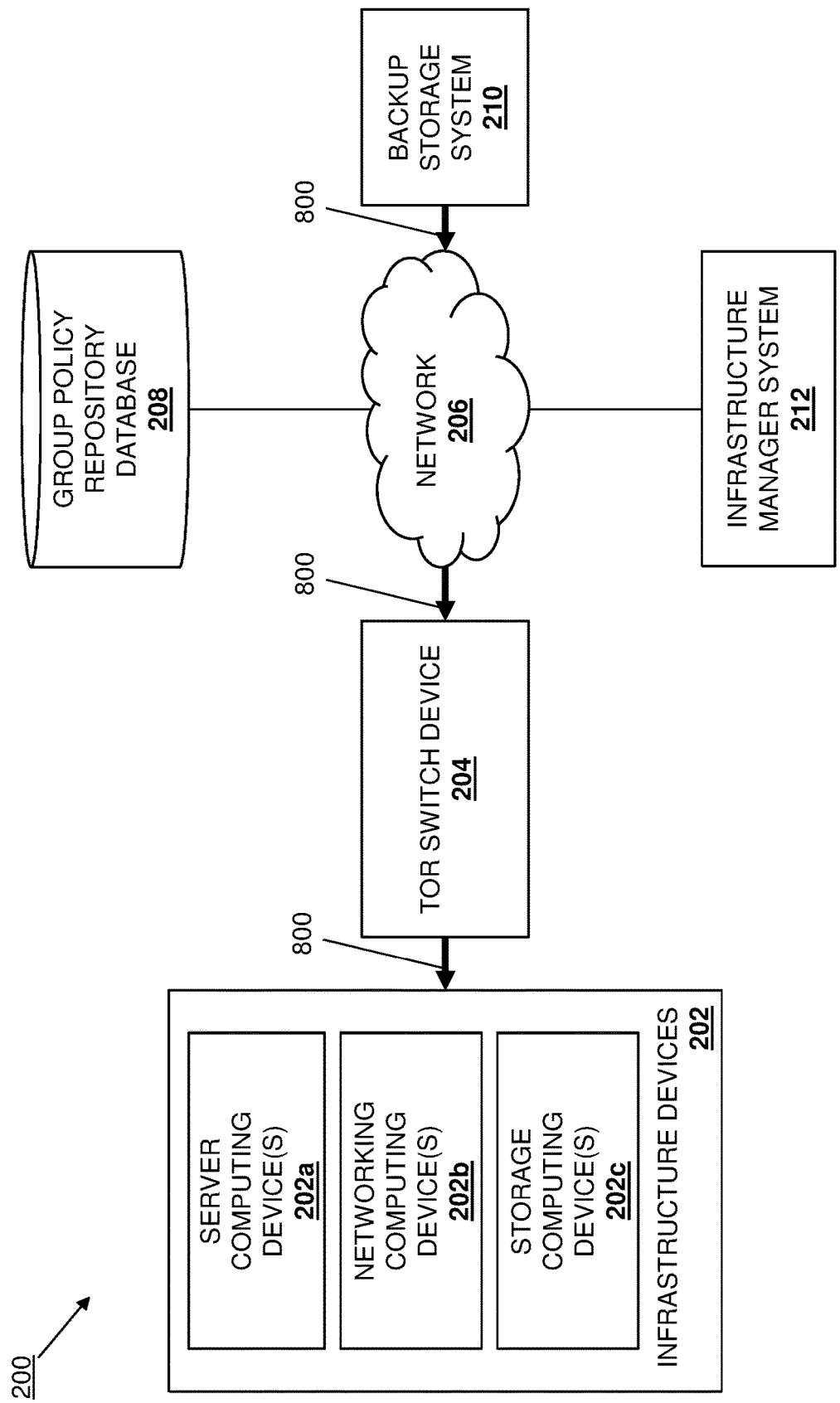
FIG. 8A is a schematic view illustrating an embodiment of the infrastructure backup system of FIG. 2 operating during the method of FIG. 5.
Figure 8B:
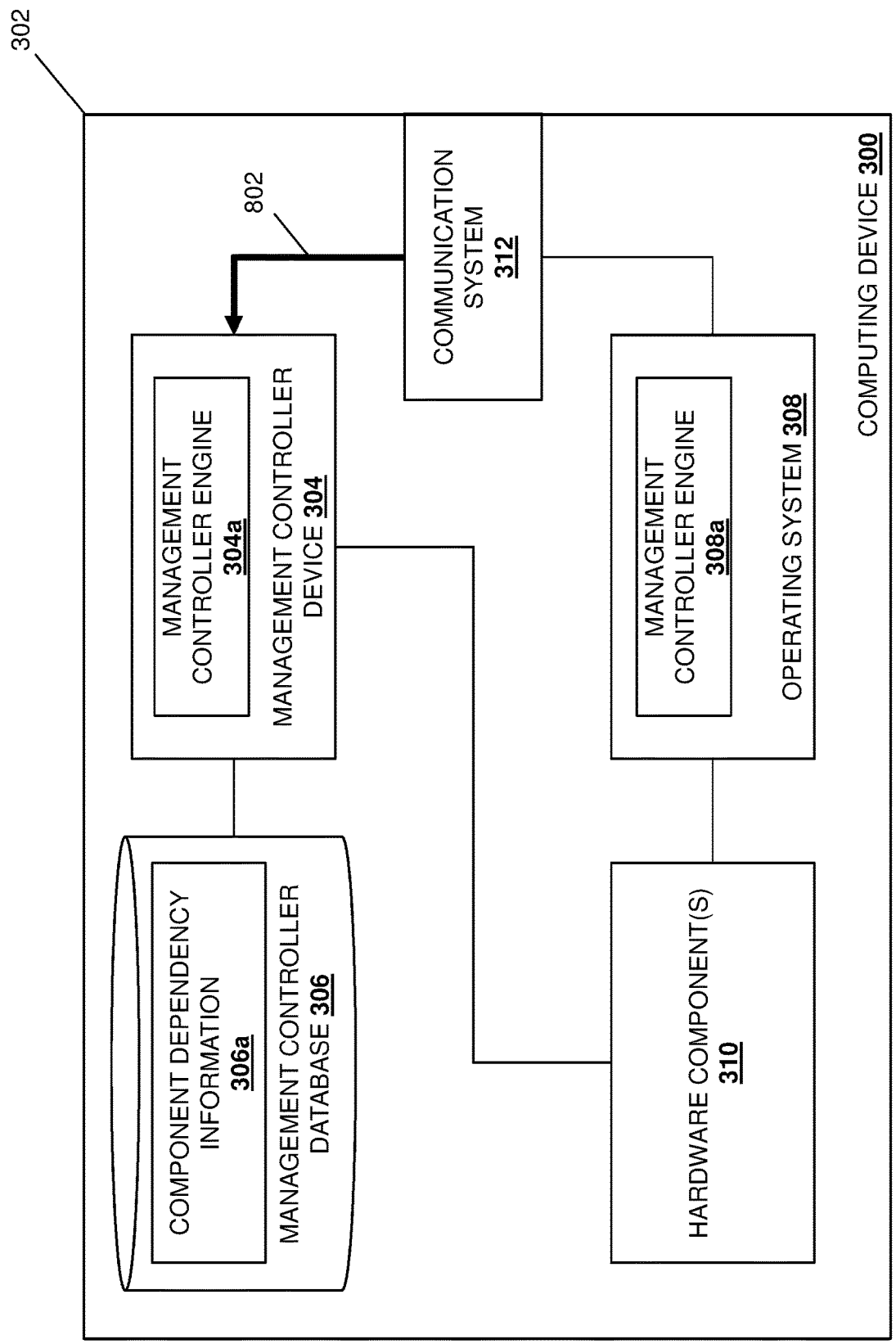
FIG. 8B is a schematic view illustrating an embodiment of the computing device of FIG. 3 operating during the method of FIG. 5.

The method 500 then proceeds to optional block 512 where the management controller in the first infrastructure device may perform restoration operations using the component backup data in the event the cloud infrastructure system becomes unavailable. In an embodiment, at optional block 512, a component in the infrastructure devices 202 that provide the cloud infrastructure system may fail and/or otherwise become unavailable. With reference to FIGS. 8A and 8B, in response to a component in the infrastructure devices 202 that provide the cloud infrastructure system failing and/or otherwise becoming unavailable, the management controller engine 304a in the management controller device 304 may perform backup data retrieval operations 802 that operate to retrieve the backup data for the infrastructure devices 202 from the backup storage system 210, via the network 206, and through the TOR switch device 204 such that it receives that backup data via its communication system 308. In some embodiments, the backup data retrieval operations 802 may be triggered by a restoration instruction transmitted by the infrastructure manager system 212 in response to the failure of the component(s).

Figure 8C:
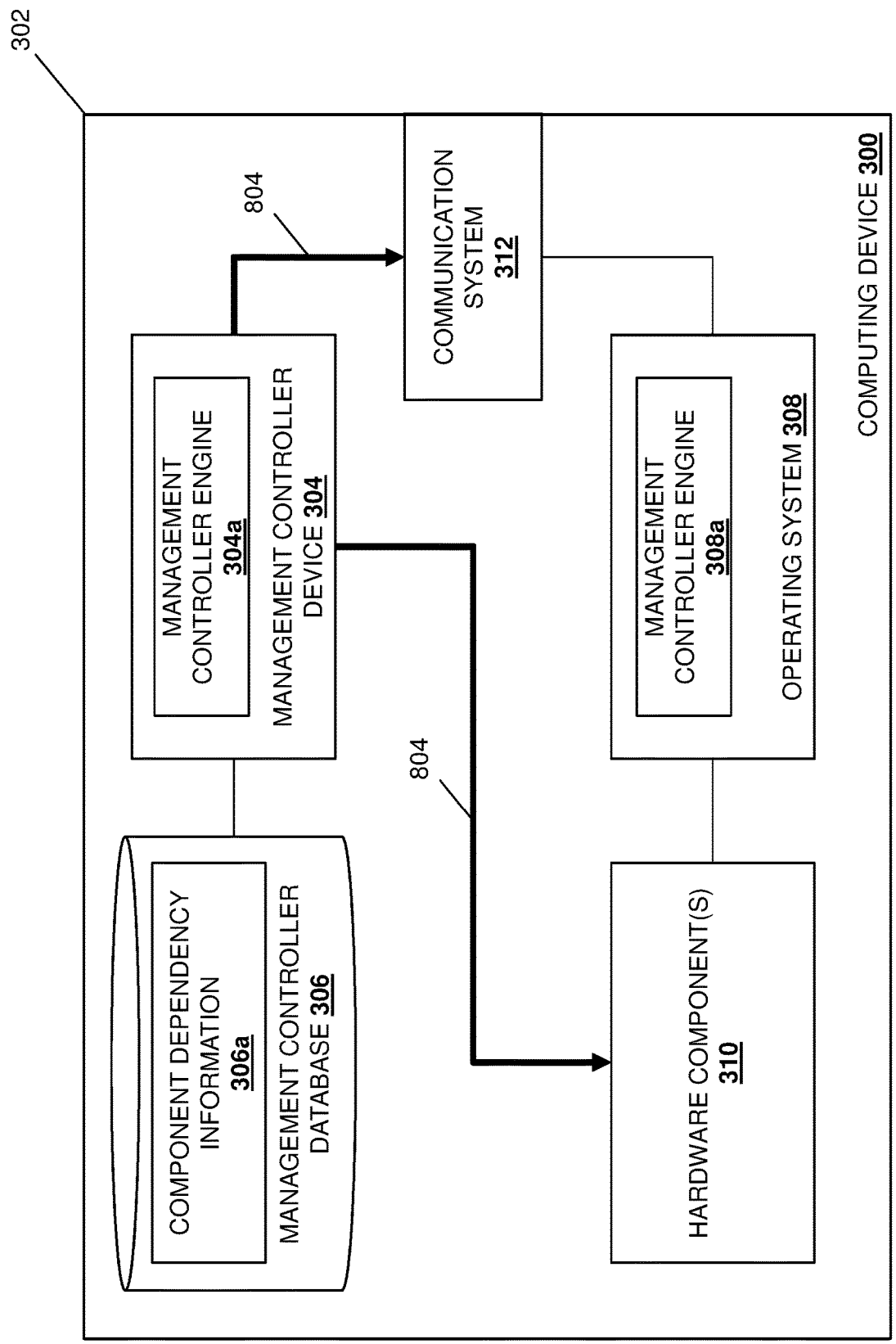
FIG. 8C is a schematic view illustrating an embodiment of the computing device of FIG. 3 operating during the method of FIG. 5.

With reference to FIG. 8C, the management controller engine 304a in the management controller device 304 may perform restoration operations 804 that include restoring components in the infrastructure devices 202 using the backup data for those components that was retrieved at block 512. For example, continuing with the example of the failure of a NIC in the computing device 300, the restoration operations 804 may include restoring the NIC that failed (i.e., the restoration operations 804 between the hardware component(s) 310 and the management controller device 304 in FIG. 7C), and restoring the port settings on the TOR switch device 204 that are dependent on the NIC (i.e., the restoration operations 804 between the communication system 312 and the management controller device 304 in FIG. 7C that access the TOR switch device 204 to restore the port settings), as well as restoring the rest of the components in the infrastructure devices 202 using the latest backup data retrieved for those infrastructure devices 202. As will be appreciated by one of skill in the art in possession of the present disclosure, the restoration operations 804 may utilize any of a variety of metadata, configuration data, settings data and/or other backup data that was collected and stored for the components in the infrastructure devices 202, while remaining within the scope of the present disclosure. As such, the restoration operations 804 may include restoring configurations, settings, and/or other data on the components in the infrastructure devices 202 that provide the cloud infrastructure system in one instance such that those configurations, settings, and/or other data are consistent across the different components in the infrastructure devices 202 that provide the cloud infrastructure system in the state it operated in immediately prior to the backup operations performed at blocks 508.

Thus, systems and methods have been described that provide for the backing up of cloud components utilized to provide a cloud infrastructure system based on dependencies between those cloud components and in response to a predicted failure of one or more of those cloud components, which results in hardware and software component-synchronized backup data for cloud components in the cloud infrastructure system that may be used to restore the cloud infrastructure system in the event it becomes unavailable. For example, the cloud infrastructure backup system includes a cloud infrastructure manager system coupled to cloud infrastructure via a network, with a first cloud infrastructure device including a BMC database that stores cloud component dependency information that identifies at least one dependency between a first cloud component that is included in the first cloud infrastructure device and a second cloud component that is included in a second cloud infrastructure device. A BMC in the first cloud infrastructure device operates receive an identification of a predicted failure for the first cloud component via the network from the cloud infrastructure manager system and, based on the identification of the predicted failure for the first cloud component, performs first backup operations on the first cloud component to generate first cloud component backup data. Furthermore, based on the component dependency information that identifies at least one dependency between the first cloud component and the second cloud component, the BMC performs second backup operations on the second cloud component to generate second cloud component backup data, and transmits the first cloud component backup data and the second cloud component backup data via the network for storage on a backup storage system. In the event of the unavailability of the cloud infrastructure system, the BMC in the first cloud infrastructure device may utilize the first cloud component backup data and the second cloud component backup data to restore the cloud infrastructure to its most recent state.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An infrastructure backup system, comprising:
   an infrastructure manager system; and
   a plurality of infrastructure devices that are coupled to the infrastructure manager system via a network, wherein a first infrastructure device in the plurality of infrastructure devices includes:
     a management controller database that stores component dependency information that identifies at least one dependency between a first component that is included in the first infrastructure device and a second component that is included in a second infrastructure device in the plurality of infrastructure devices; and
     a management controller device that is coupled to the management controller database and that is configured to:
       receive, via the network from the infrastructure manager system, an identification of a predicted failure for the first component;
       perform, based on the identification of the predicted failure for the first component, first backup operations on the first component to generate first component backup data;
       perform, based on the component dependency information that identifies at least one dependency between the first component and the second component, second backup operations on the second component to generate second component backup data; and
       transmit the first component backup data and the second component backup data via the network for storage on a backup storage system.

2. The system of claim 1, wherein the management controller device is configured to:
   generate an alert associated with the operation of the first component; and
   transmit the alert via the network to the infrastructure management system.

3. The system of claim 1, wherein the first component backup data includes first component configuration information, and wherein the second component backup data includes second component configuration information.

4. The system of claim 1, wherein the first component is a hardware component, and wherein the second component is a software component.

5. The system of claim 1, wherein the management controller device is configured to:
   synchronize the component dependency information stored in the management controller database with component dependency information stored in the infrastructure manager system.

6. The system of claim 1, wherein the management controller device is configured to:
   retrieve the first component backup data and the second component backup data via the network from the backup storage system;
   restore the first component using the first component backup data retrieved from the backup storage system; and
   restore the second component using the second component backup data retrieved from the backup storage system.

7. An Information Handling System (IHS), comprising:
   a processing system; and
   a memory system that is coupled to the processing system and that includes instructions that, when executed by the processing system, cause the processing system to provide a management controller engine that is configured to:
     receive, via a network from an infrastructure manager system, an identification of a predicted failure for a first component included in a first infrastructure device;
     perform, based on the identification of the predicted failure for the first component, first backup operations on the first component to generate first component backup data;
     perform, based on component dependency information that identifies at least one dependency between the first component and a second component in a second infrastructure device, second backup operations on the second component to generate second component backup data; and
     transmit the first component backup data and the second component backup data via the network for storage on a backup storage system.

8. The IHS of claim 7, wherein the management controller engine is configured to:
   generate an alert associated with the operation of the first component; and
   transmit the alert via the network to the infrastructure management system.

9. The IHS of claim 7 wherein the first component backup data includes first component configuration information, and wherein the second component backup data includes second component configuration information.

10. The IHS of claim 7, wherein the first component is a hardware component, and wherein the second component is a software component.

11. The IHS of claim 7, wherein the management controller engine is configured to:
    synchronize the component dependency information that is stored in a management controller database coupled to the management controller engine with component dependency information stored in the infrastructure manager system.

12. The IHS of claim 7, wherein the management controller engine is configured to:
    retrieve the first component backup data and the second component backup data via the network from the backup storage system;
    restore the first component using the first component backup data retrieved from the backup storage system; and
    restore the second component using the second component backup data retrieved from the backup storage system.

13. The IHS of claim 7, wherein the first component backup operations and the second component backup operations are performed based on a predicted failure time period provided with the predicted failure for the first component.

14. A method for backing up infrastructure devices, comprising:
receiving, by a management controller device in a first infrastructure device via a network from an infrastructure manager system, an identification of a predicted failure for a first component included in the first infrastructure device;
performing, by the management controller device based on the identification of the predicted failure for the first component, first backup operations on the first component to generate first component backup data;
performing, by the management controller device based on component dependency information that identifies at least one dependency between the first component and a second component in a second infrastructure device, second backup operations on the second component to generate second component backup data; and
transmitting, by the management controller device, the first component backup data and the second component backup data via the network for storage on a backup storage system.

15. The method of claim 14, further comprising:
generating, by the management controller device, an alert associated with the operation of the first component; and
transmitting, by the management controller device, the alert via the network to the infrastructure management system.

16. The method of claim 14, wherein the first component backup data includes first component configuration information, and wherein the second component backup data includes second component configuration information.

17. The method of claim 14, wherein the first component is a hardware component, and wherein the second component is a software component.

18. The method of claim 14, further comprising:
synchronizing, by the management controller device, the component dependency information that is stored in a management controller database coupled to the management controller engine with component dependency information stored in the infrastructure manager system.

19. The method of claim 14, further comprising:
retrieving, by the management controller device, the first component backup data and the second component backup data via the network from the backup storage system;
restoring, by the management controller device, the first component using the first component backup data retrieved from the backup storage system; and
restoring, by the management controller device, the second component using the second component backup data retrieved from the backup storage system.

20. The method of claim 14, wherein the first component backup operations and the second component backup operations are performed based on a predicted failure time period provided with the predicted failure for the first component.

* * * * *